(12) United States Patent
De Greef

(10) Patent No.: US 6,691,854 B1
(45) Date of Patent: Feb. 17, 2004

(54) DEVICE FOR ORIENTING A NUMBER OF SIMILAR OBJECTS, SUCH AS FRUITS

(76) Inventor: Jacob Hendrik De Greef, Dorpsstraat 19, 4181 BM, Waardenburg (NL)

( * ) Notice: Subject to any disclaimer, the term of this patent is extended or adjusted under 35 U.S.C. 154(b) by 17 days.

(21) Appl. No.: 10/009,279

(22) PCT Filed: Jun. 8, 2000

(86) PCT No.: PCT/NL00/00396
§ 371 (c)(1),
(2), (4) Date: Mar. 12, 2002

(87) PCT Pub. No.: WO01/16003
PCT Pub. Date: Mar. 8, 2001

(30) Foreign Application Priority Data

Jun. 8, 1999 (NL) ............................................. 1012258

(51) Int. Cl.$^7$ ........................ B65G 43/08; B65G 47/24; B65G 17/32; B65G 29/00; B65G 47/84
(52) U.S. Cl. ................... 198/395; 198/377.01; 198/384
(58) Field of Search ................................ 198/384, 385, 198/387, 377.01, 395

(56) References Cited

U.S. PATENT DOCUMENTS

| | | | | |
|---|---|---|---|---|
| 3,605,984 A | * | 9/1971 | Erekson et al. | 198/384 |
| 4,161,366 A | * | 7/1979 | Bol et al. | 356/56 |
| 4,872,564 A | * | 10/1989 | van der Schoot | 198/387 |
| 5,626,238 A | * | 5/1997 | Blanc | 198/370.04 |
| 6,079,542 A | * | 6/2000 | Blood | 198/384 |

* cited by examiner

Primary Examiner—Gene O Crawford
(74) Attorney, Agent, or Firm—Mark Zovko

(57) ABSTRACT

A device for orienting a number of objects. The device has a holder conveyor with holders for the objects, lifts synchronously co-displaceable with the holders and rotatable relative thereto for lifting the objects out of the holders and rotating the objects into and oriented standing rotational position relative to a standing rotation axis on the holders, a detector for detecting the standing rotational position of each object and a control device for the lifts which is connected to the detector and which activates the lifts for a relevant object as long as is required to rotate the oriented standing rotational position.

7 Claims, 5 Drawing Sheets

DEVICE FOR ORIENTING A NUMBER OF SIMILAR OBJECTS, SUCH AS FRUITS

BACKGROUND OF THE INVENTION

1. Field of the Invention

The invention relates to a device for orienting a number of objects such as fruits.

2. Discussion of the Prior Art

For the sale of fruit such as apples, pears and the like it is desirable for these to be arranged as attractively as possible in a packing box, i.e. all fruits with the stalk in the same direction and, if appropriate, with the bloom facing upward. In the prior art, this work is usually done manually.

The invention has for its object to provide a device with which this work, which is normally performed manually, can take place automatically.

SUMMARY OF THE INVENTION

This objective is achieved with the device according to the invention as disclosed. The lifting means can rotate the objects, such as fruits, such that for instance the stalks all point in the same direction. The subsequent packaging of the objects in the oriented positions can then take place simply with mechanical means.

By causing the lifting means to engage from below, the objects remain readily accessible from above and visible for the detector.

A favourable further development is disclosed herein. It is hereby possible to have the holder conveyor run continuously, whereby a high capacity of the device can be achieved. The lifting means engage the objects for rotating and rotate them if necessary as the holder conveyor advances.

A favourable, simple drive of the object carriers of the lifting means is obtained by the present invention. Rotating of the object carrier, for the purpose of turning the objects on the standing axis of rotation, is realized by the disc rolling along over the stationary strip. The detector determines when the desired standing rotational position has been reached and at that moment moves the stationary strip out of engagement with the disc, whereby the rotation stops.

The desired vertical movement of the lifting means for lifting the objects out of the holders is achieved in favourable manner. The vertical movement is here also brought about by the advancing movement of the carrier conveyor. In this way no separate drive means are thus required for either the lifting or the rotation. The movements are derived from the movement of the conveyor.

The device further enables rotation of the objects on a lying axis of rotation. It is hereby possible for instance in the case of particular fruits to turn the bloom upward so that the fruits for packing all come to lie in the final packaging with the most attractive side upward.

In per se known manner the rotation bodies can take a diabolo form, wherein two adjacent diabolos define in each case one holder. Through rotation of the rotation bodies the objects will also co-rotate on a lying rotation axis.

The rotating means can be embodied in very suitable manner. The rotational drive of the rotation bodies is therefore brought about by these rolling over the stationary strip. The detector ensures that the strip is held in contact with the rotation bodies as long as is required to rotate the objects in question into the desired lying rotational position. The strip is then moved out of contact with the rotation bodies so that the rotation stops.

The invention will be further elucidated in the following description with reference to the annexed drawings.

DETAILED DESCRIPTION OF THE PREFERRED EMBODIMENT

Figure 1:
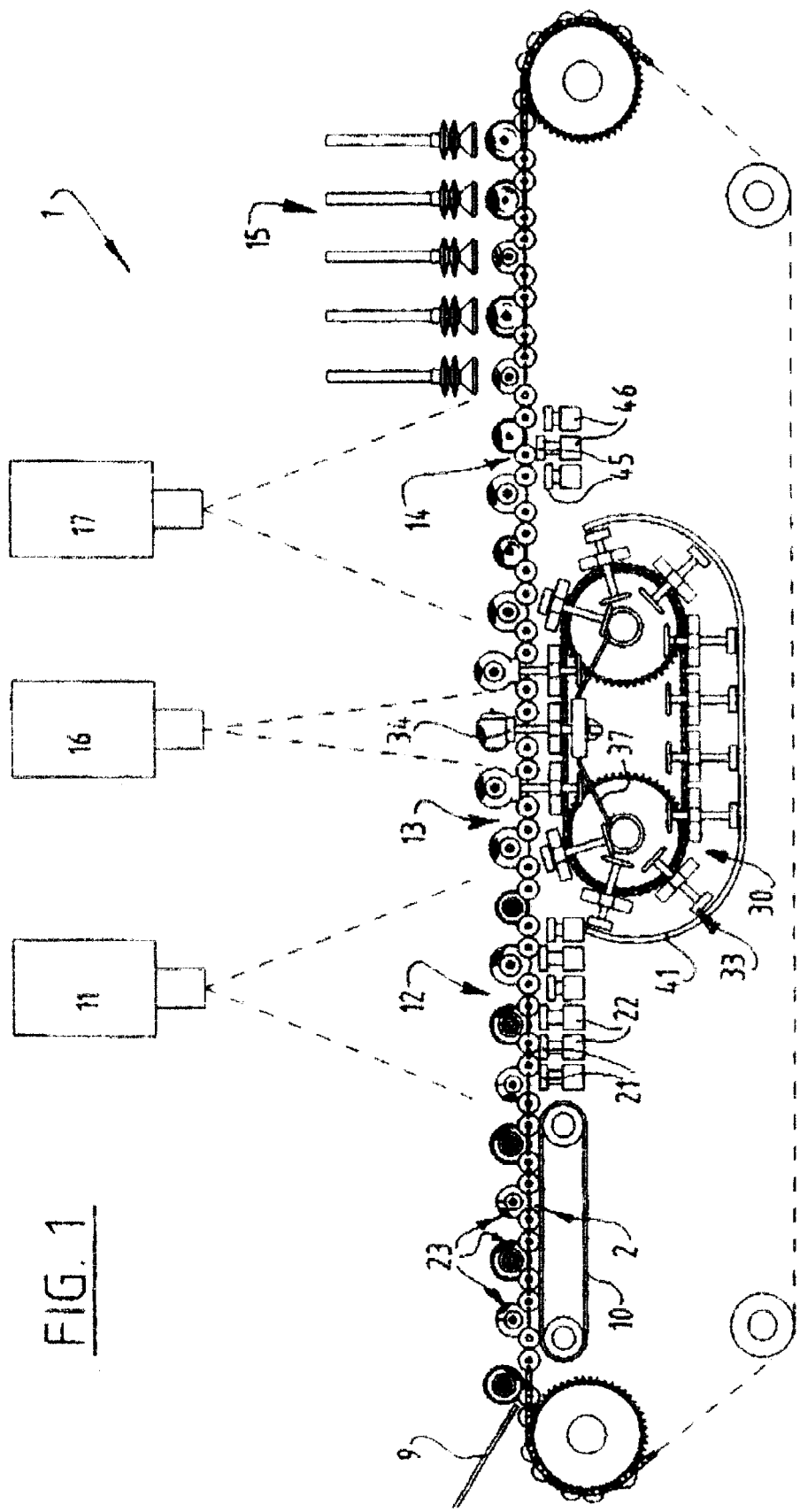
FIG. 1 shows a partly schematic side view of a device according to a preferred embodiment of the invention.
Figure 2:
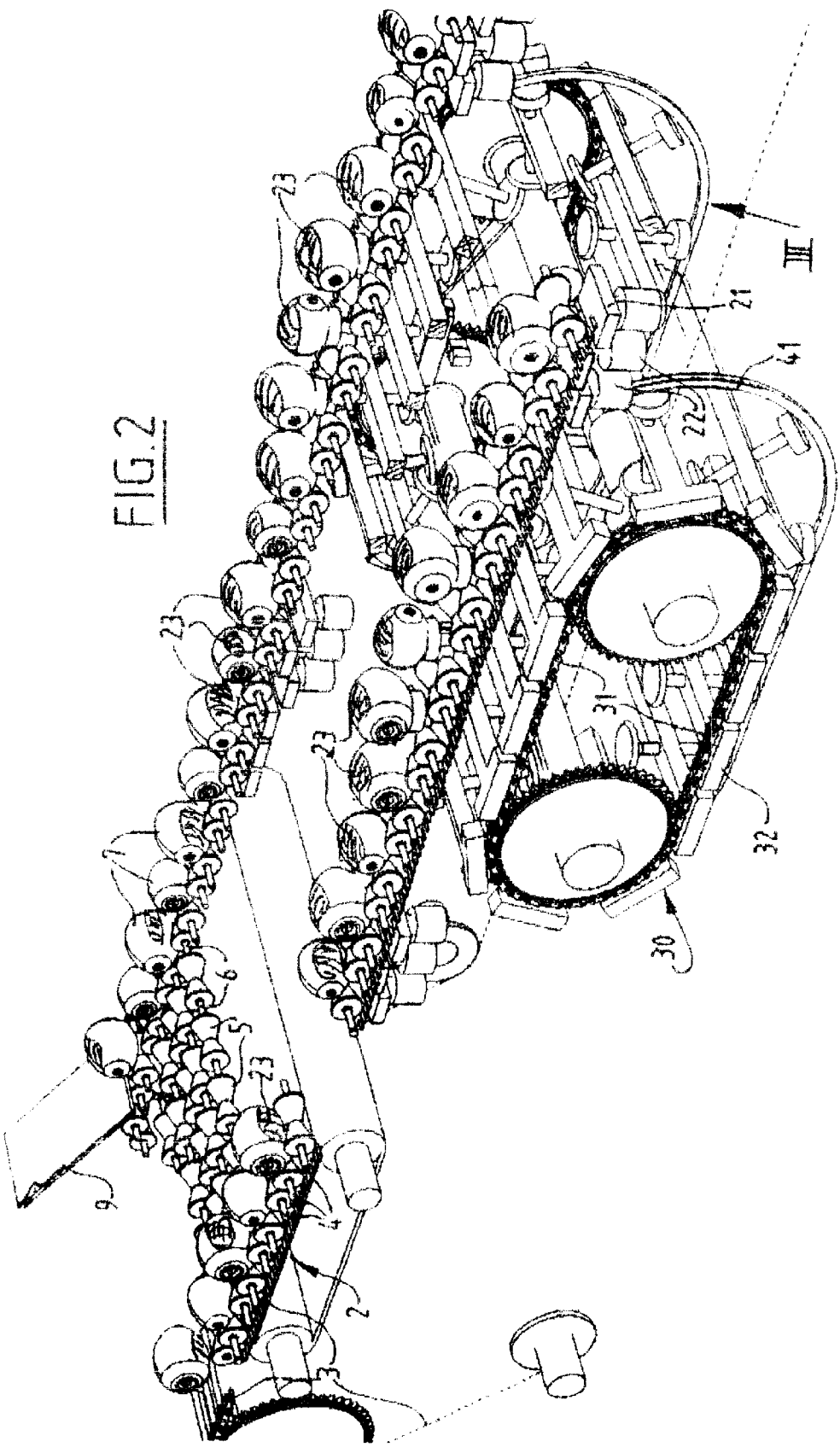
FIG. 2 is a partly broken away perspective view of the device of FIG. 1.
Figure 3:
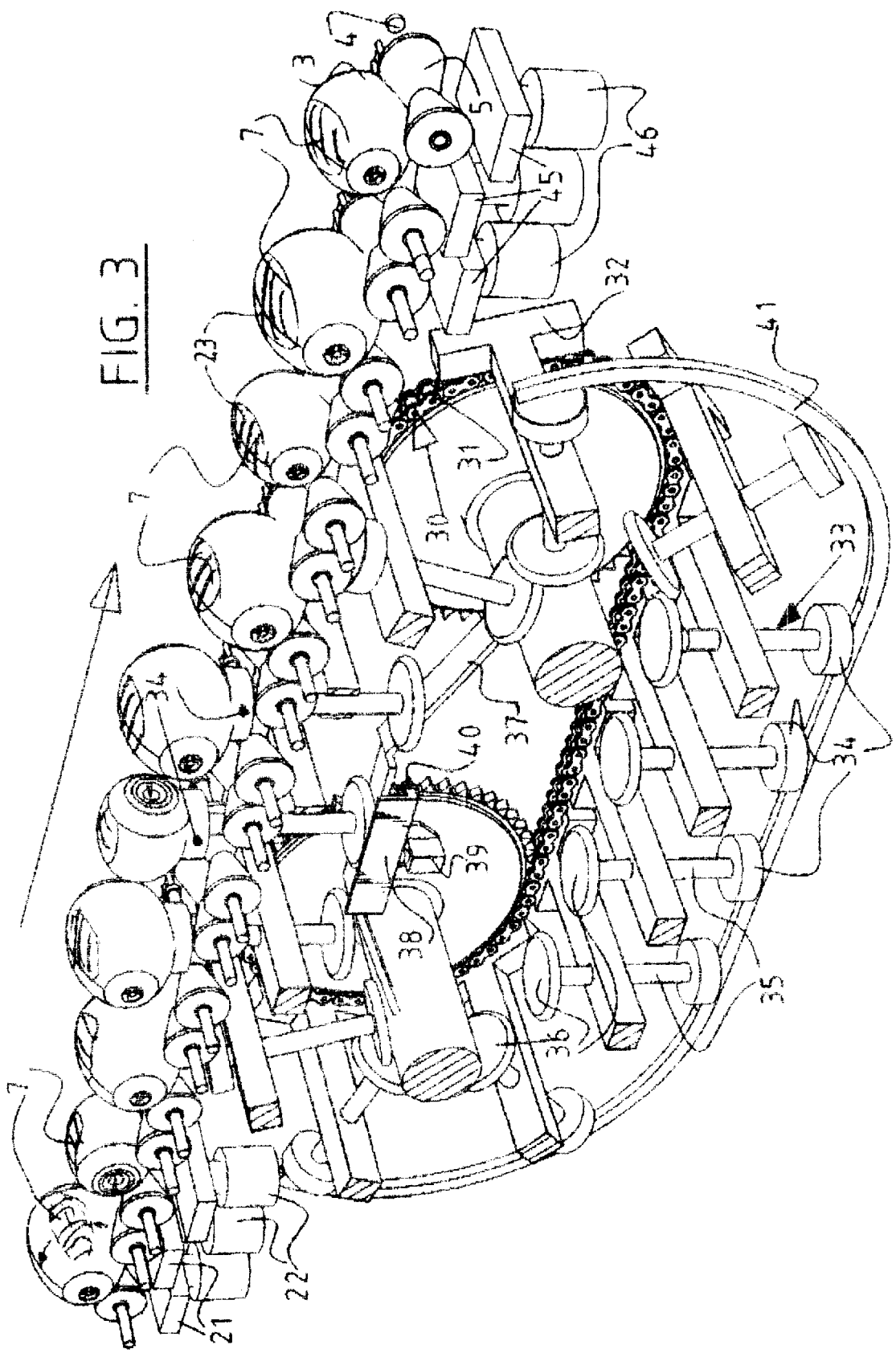
FIG. 3 is a perspective detail view along arrow III in FIG. 2.

The device 1 shown in FIG. 1 is intended for orienting a number of objects, in this case fruit such as applies. The orienting takes place such that the apples, which are supplied in wholly random manner, finally come to lie in the same position in a packing box, i.e. all with the stalk in the same direction.

The device 1 according to the preferred embodiment of the invention further comprises the option of orienting the apples with their bloom facing upward.

Device 1 comprises a holder conveyor 2 with holders 6 for receiving and transporting the fruits 7. Holder conveyor 2 comprises two chains 3 which are disposed at a distance parallel to each other and between with a number of shafts 4 are arranged which each bear a number of diabolos 5. A holder 6 for receiving a fruit 7 is formed in each case between two adjacent diabolos.

The supply station 9 is situated as seen in FIG. 1 on the left-hand side of the upper horizontal part of holder conveyor 2. Here apples are carried onto the conveyor belt, where they nestle in holders 6 in supply station 9. Arranged under the upper part of holder conveyor 2 in supply station 9 is an endless conveyor 10 which is in contact with the underside of diabolos 6. The diabolos 6 are rotated by driving conveyor 10 in a suitable direction or by stopping it, which contributes towards proper positioning of fruits 7 in holders 6.

Arranged above holder conveyor 2 are a number of detectors, of which detector 11 co-acts with control means for a station 12 for orienting the fruits on a lying rotation axis which lies transversely of the transporting direction, i.e. is parallel to shafts 4. The associated rotational position of each fruit is referred to hereinbelow as the lying rotational position.

Detector 11, which can particularly comprise a camera, is connected to processing means which can process an image formed by the camera such that the bloom of fruits 7 can be recognized. The bloom is designated schematically in FIG. 1 with a strip 23.

In the station 12 for the lying rotational position there are arranged under the diabolos fixedly disposed strips 21 or surfaces which can be moved up and downward by means of cylinders 22. In the moved upward position these strips 21 lie against the bottom surface of the diabolos so that, as the conveyor 2 advances, these diabolos 6 roll over these strips. The fruits lying in the holders formed by the diabolos therefore co-rotate.

If it is now determined using detector 11 that a fruit 7 arriving in station 12 for the lying rotational position does not lie with the bloom upward, the cylinders 22 are operated by a suitable and further self-evident control device such that the diabolos of the holder in which the relevant fruit is lying are activated until the fruit in question lies with its bloom upward. Strips 21 which further pass the relevant holder in station 12 are held in moved downward position so that the position with the bloom upward, once found, is maintained. Although this is not shown in detail in the drawings, it will be apparent that under each row of holders, of which there are six in the embodiment under discussion here, there is disposed an array of strips 21 arranged on cylinders 22.

After passing through station 12, the fruits enter station 13 for orienting the fruits in a standing rotational position. This standing rotational position is so named because the orienting takes place on a standing rotation axis. Orienting of the apples 7 in the desired standing rotational position takes place in order to have all the stalks thereof pointing in the same direction.

In the station 13 for the standing rotational position a detector 16 is once again arranged, likewise comprising a camera. Coupled to this camera are processing means which can recognize from the form of apple 7 in which direction the stalk is pointing.

To enable orienting of the fruits in the standing rotational position the device 1 comprises rotatable lifting means 33 with which the fruits can be lifted out of their holder and can be rotated into the desired standing rotational position.

Lifting means 33 are arranged on a carrier conveyor 30 mounted beneath the upper horizontal part of holder conveyor 2. Carrier conveyor 30 is driven synchronously with the holder conveyor so that the lifting means moving in the upper horizontal part of carrier conveyor 30 move at the same speed as the holders in holder conveyor 2.

Carrier conveyor 30 generally comprises two chains 31 placed at a mutual distance on which are arranged a number of transverse frames 32. Lifting means 33 comprise for each holder in the holder conveyor a carrier 34 which is arranged on the top end of the a sliding shaft 35 and received slidably and rotatably in a transverse frame 32. A disc 36 is arranged in each case on the opposite end of the sliding shaft.

For each row of holders in the holder conveyor a row of lifting means 33 is here also arranged in the carrier conveyor. Associated with each row of lifting means 33 is a curve track 37 with which the bottom ends of lifting means 33 come into contact when they are situated in the upper horizontal part of carrier conveyor 30. As the carrier conveyor advances, the bottom end of the lifting means run up against curve track 37 so that they are pushed upward. Carrier conveyor 30 is adjusted relative to the holder conveyor such that each carrier 34 of one of the lifting means 33 moves upward in a holder formed between opposite diabolos of holder conveyor 2. A fruit lying in this holder is therefore herein lifted out of holder 6 by the carrier.

Detector 16 has in the meantime determined with the associated processing means what the standing rotational position of the relevant apple 7 is and whether the apple must be rotated on the vertical rotation axis.

If this is the case, the control device will cause carrier 34 to rotate. This takes place through activation of an electromagnet 39 which is arranged on the frame of the device and which in the active state presses a stationary strip 38 rotatable on a hinge 40 against the periphery of the disc 36 in question. As a consequence of the continuing movement of the conveyor the disc 36 will hereby roll along strip 38, whereby sliding shaft 35 and carrier 34, and therefore fruit 7, rotate on the vertical rotation axis. Detector 16 detects when the desired rotational position has been reached and then ends energizing of electromagnet 39.

As the holders move further in the transporting direction the bottom end of the sliding shaft, i.e. the disc 36, slides gradually downward along curve track 37, wherein the carrier in the relevant holder moves downward and sets the fruit down in the holder.

Arranged around the lifting means 33 for each row of the holder conveyor is an enclosing rail 41 against which carriers 34 rest during the return movement along the lower part of carrier conveyor 30. Carriers 34 hereby do not protrude very far downward, so that the carrier conveyor with carriers and associated elements moved thereby remains compact.

Subsequent to station 13 for orienting into the standing rotational position, there follows a further second station 14 for orienting of the fruits into the lying rotational position. Also arranged here is a detector 17 which determines whether the lying rotational position realized in station 12 has not been disturbed, and which by activating cylinders 46 optionally corrects this lying rotational position again using strips 45 operated by this cylinder 46. The operation is further identical to that of station 12 for the lying rotational position.

After leaving station 14 the fruits 7 thus all lie with the stalk in the same direction and with the bloom facing upward. These fruits can then be removed from holder conveyor 2 in the following discharge station 15 and be placed in a box in which they are further transported to the final consumers.

Figure 4:
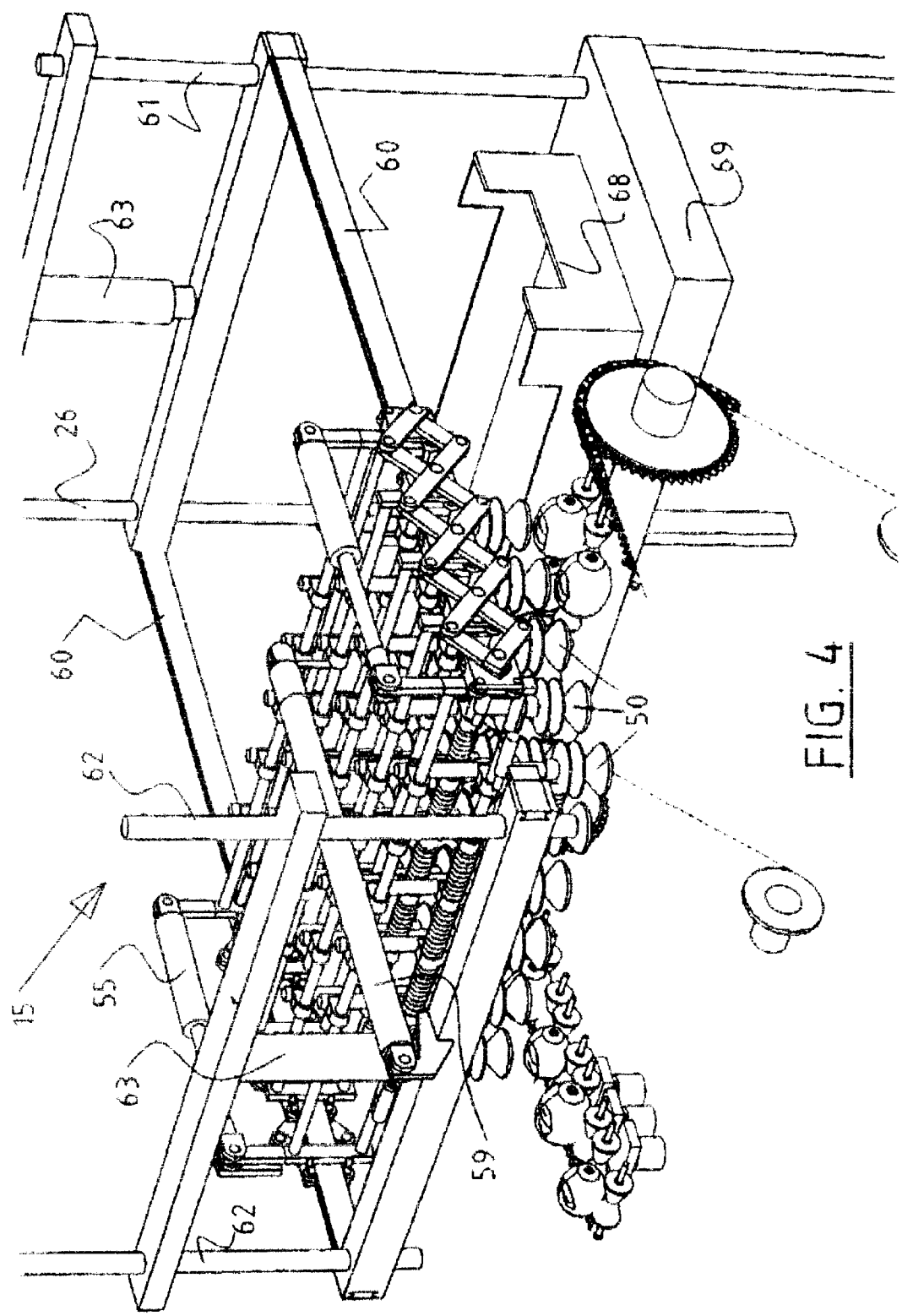
FIG. 4 is a partly broken away perspective view of the discharge station of the device of FIG. 1.
Figure 5:
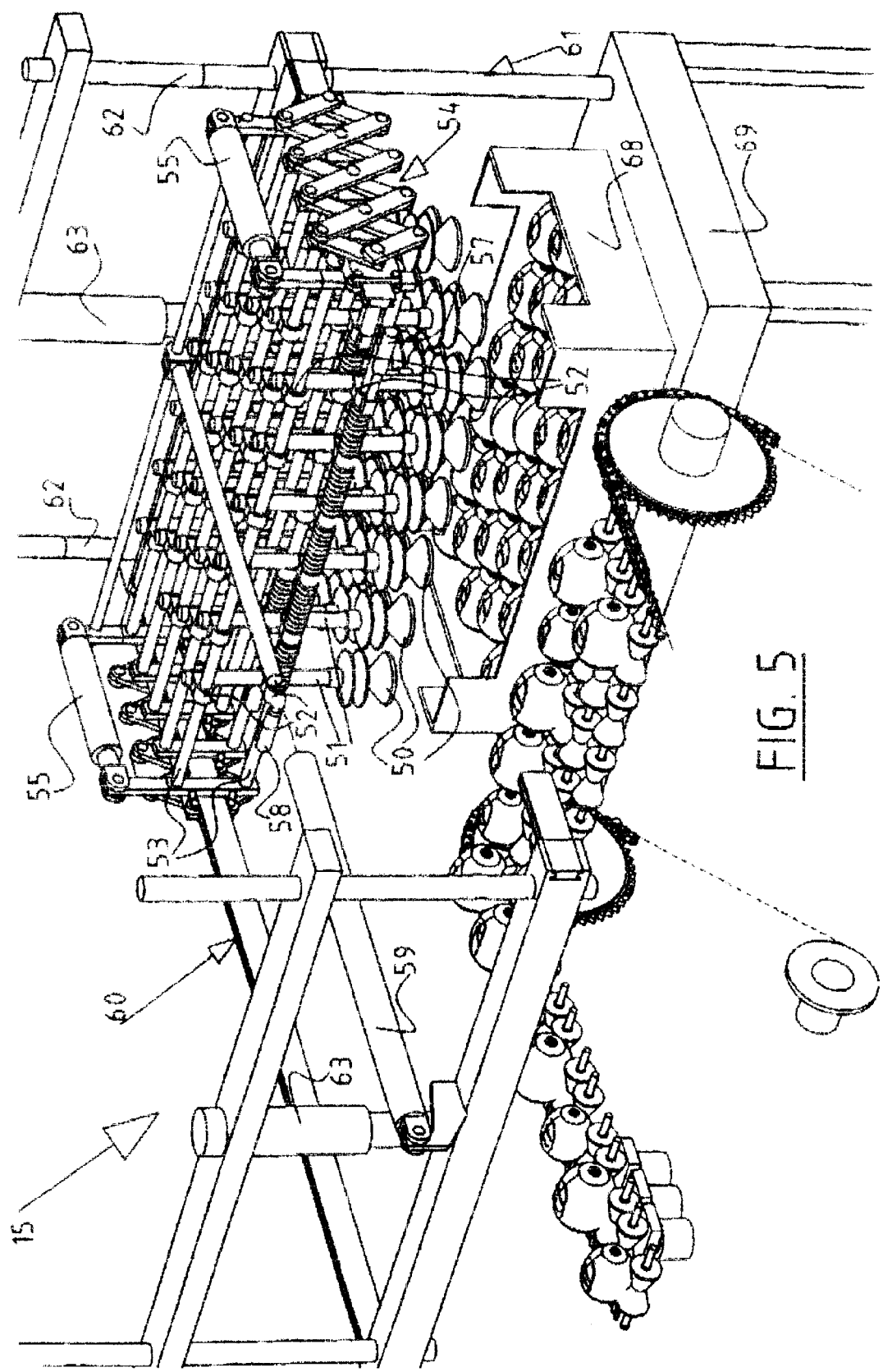
FIG. 5 is a view corresponding with FIG. 4 of the discharge station in a different operational position.

Picking up of the oriented apples from the holder conveyor takes place with per se known suction elements 50 as shown in FIGS. 4 and 5. Each suction element 50 is arranged on the lower end of a rod 51. Rod 51 is connected slidably in the direction transversely of the conveyor to two rods 52, 53 placed one above the other. Together with a number of corresponding pairs of rods following in the transporting direction, these rods 52, 53 are arranged on scissor link constructions 54 on either side of the conveyor. Scissor link constructions 54 can be extended and retracted using cylinders 55. In the extended position shown in FIG. 4 the suction elements 50 have a mutual distance as seen In the transporting direction which corresponds with the mutual distance between holders 6 in holder conveyor 2. In the retracted position shown in FIG. 5 the suction elements 50 lie closer to each other in said transporting direction, this such that the fruits to be picked up thereby can be placed practically against each other in the packing box 68.

In addition to the fruits for packaging being moved in this manner towards each other in the transporting direction, they are also moved towards each other in the direction transversely thereof.

For this purpose the rods 51 mounted on an associated sliding rod pair 52, 53 are mutually separated by sets of cup springs 56. Cylinders 57, 58 are situated on either side. In the non-loaded state of cylinders 57, 58 shown in the figure the sets of cup springs are expanded, as a consequence of which the suction elements 50 are situated in the direction transversely of the transporting direction at the same distances as the holders for receiving the fruits. By activating one of the cylinders 57 or 58 the transverse row of suction elements 50 is placed at a smaller mutual distance and pushed to one side. By loading alternate cylinders in the successive rows of suction elements 50, a mutually staggered position of the suction elements, and therefore of the fruits carried thereby, can be achieved, so that fruits for placing in box 68 are set down as efficiently as possible in this box 68.

The discharge device operates as follows.

In the situation of FIG. 4 the scissor link constructions 54 are extended using cylinders 55 and the cylinders 57, 58 for the sets of cup springs 56 are not loaded, so that suction elements 50 are situated at the same mutual distances as holders 6 of holder conveyor 2. As soon as conveyor 2 has moved oriented fruits 7 under all suction elements 50, the set of suction elements 50 is moved downward by the frame 60 on which they are arranged being displaced along sliding rods 62 using cylinders 63. As soon as suction elements 50 are in contact with apples 7 the suction is started, whereby the apples are drawn against suction elements 50. Frame 60 is then moved upward again with cylinder 63, and the set of suction elements 50, which is itself mounted slidably in frame 60, is moved using cylinder 59 to a position above the box 68 placed on table 69. Cylinders 55 and alternate cylinders 57, 58 are meanwhile activated, whereby the apples are moved closely against each other into a mutual position corresponding with that which they will occupy in box 68. When the assembly has arrived above box 68 and the apples have been moved towards each other in the described manner, cylinders 63 are activated once again to move frame 60 downward and lay off the apples in box 68. The vacuum is subsequently released and the assembly of suction elements 50 is moved upward again and back to a position above the holder conveyor in order to begin a new cycle.

What is claimed is:

1. Device for orienting a number of objects, comprising a number of holders for the objects, lifting means rotatable relative thereto for lifting the objects out of the holders and rotating the objects into an oriented standing rotational position relative to a standing rotation axis on the holder, a detector for detecting the standing rotational position of each object and a control device for the lifting means which is connected to the detector and which activates the lifting means for a relevant object as long as is required to rotate this into the oriented standing rotational position, characterized by a holder conveyor for the holders and wherein the lifting meanse are synchronously co-displaceable with the holders and wherein the holders are moved substantially horizontally and are provided with a continuous opening and the lifting means are movable upward through the opening.

2. Device as claimed in claim 1, wherein the lifting means comprise object carriers which are rotatable on a substantially vertical rotation axis and which are connected to a carrier conveyor disposed under the holder conveyor and driven synchronously with the holder conveyor.

3. Device as claimed in claim 2, wherein each object carrier comprises a disc which is fixedly connected thereto and concentric to the rotation axis, and the device comprises a strip which extends in the direction of movement, which is stationary in this direction and movable under control of the control device between an active position, in which it is in contact with the periphery of the disc, and a rest position in which it is free thereof.

4. Device as claimed in claim 2, wherein the object carriers are arranged for vertical sliding on the carrier conveyor, and a stationary curve track rising at least partially relative to the direction of movement of the holder conveyor is arranged with which the object carriers come into contact during their movement.

5. Device as claimed in claim 1, further comprising rotating means for rotating the objects into an oriented lying rotational position relative to a rotation axis lying substantially in the plane, of the holder, a detector for detecting the lying rotational position of each object and a control device for the rotating means which is connected to the detector and which activates the rotating means for a relevant object as long as is required to rotate this into the oriented lying rotational position.

6. Device as claimed in claim 5, wherein the holders are formed by the space between a number of rotatably mounted rotation bodies, the rotation axes of which lie substantially in one horizontal plane and the rotating means drive the rotation bodies for rotation.

7. Device as claimed in claim 6, wherein the rotating means comprises a strip which extends in the direction of movement of the conveyor, which is stationary in this direction and movable under control of the control device between an active position, in which it is in contact with the periphery of at least one of the rotation bodies, and a rest position in which it is free thereof.

* * * * *